(12) United States Patent
Wang et al.

(10) Patent No.: US 12,143,306 B2
(45) Date of Patent: *Nov. 12, 2024

(54) ENHANCED NETWORK WITH DATA FLOW DIFFERENTIATION

(71) Applicant: AT&T Intellectual Property I, L.P., Atlanta, GA (US)

(72) Inventors: Huahui Wang, Bridgewater, NJ (US); Ravi Raina, Skillman, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,488

(22) Filed: Jan. 17, 2023

(65) Prior Publication Data
US 2023/0231813 A1 Jul. 20, 2023

Related U.S. Application Data

(63) Continuation of application No. 17/173,802, filed on Feb. 11, 2021, now Pat. No. 11,582,161.

(51) Int. Cl.
*H04L 47/36* (2022.01)
*H04L 47/24* (2022.01)

(52) U.S. Cl.
CPC ......... *H04L 47/365* (2013.01); *H04L 47/24* (2013.01)

(58) Field of Classification Search
CPC .............................. H04L 47/365; H04L 47/24
See application file for complete search history.

(56) References Cited

U.S. PATENT DOCUMENTS

| | | | | |
|---|---|---|---|---|
| 8,285,298 | B2* | 10/2012 | Noriega | H04W 72/543 |
| | | | | 455/418 |
| 9,699,101 | B2* | 7/2017 | Lee | H04L 47/621 |
| 9,722,926 | B2* | 8/2017 | Phaal | H04L 47/12 |
| 9,985,898 | B2* | 5/2018 | Ramaiah | H04L 47/11 |
| 10,484,907 | B2* | 11/2019 | Song | H04W 28/0257 |
| 10,772,016 | B2 | 9/2020 | Chen et al. | |
| 10,789,176 | B2* | 9/2020 | Wang | G06F 12/0864 |
| 11,088,964 | B1* | 8/2021 | Smaldone | H04L 47/821 |
| 11,240,157 | B1* | 2/2022 | Callaghan | H04L 69/22 |
| 11,582,161 | B2* | 2/2023 | Wang | H04L 47/365 |

(Continued)

OTHER PUBLICATIONS

Kim, Hoon et al., "A Proportional Fair Scheduling for Multicarrier Transmission Systems", IEEE Communications Letters, vol. 9, No. 3, Mar. 2005, pp. 210-212.

(Continued)

*Primary Examiner* — Chi H Pham
*Assistant Examiner* — Weibin Huang
(74) *Attorney, Agent, or Firm* — Guntin & Gust, PLC; Matthew Tropper

(57) ABSTRACT

Aspects of the subject disclosure may include, for example, receiving information about a data flow for radio communication between the radio access network and user equipment, classifying the data flow as one of a large data flow and a small data flow, adjusting priority of the data flow by reducing relative priority of the data flow responsive to classifying the data flow as a large data flow, and communicating data including the data flow between the radio access network and the user equipment according to the adjusted priority. Other embodiments are disclosed.

20 Claims, 10 Drawing Sheets

(56) References Cited

U.S. PATENT DOCUMENTS

2019/0379612 A1\* 12/2019 Tiwary ................ H04L 47/2433
2022/0255875 A1    8/2022 Wang et al.

OTHER PUBLICATIONS

Mamman, Maharazu et al., "Quality of Service Class Identifier (QCI) Radio Resource Allocation Algorithm for LTE Downlink", Plos One, https://doi.org/10.1371/journal.pone.0210310, Jan. 25, 2019, 22 pages.

\* cited by examiner

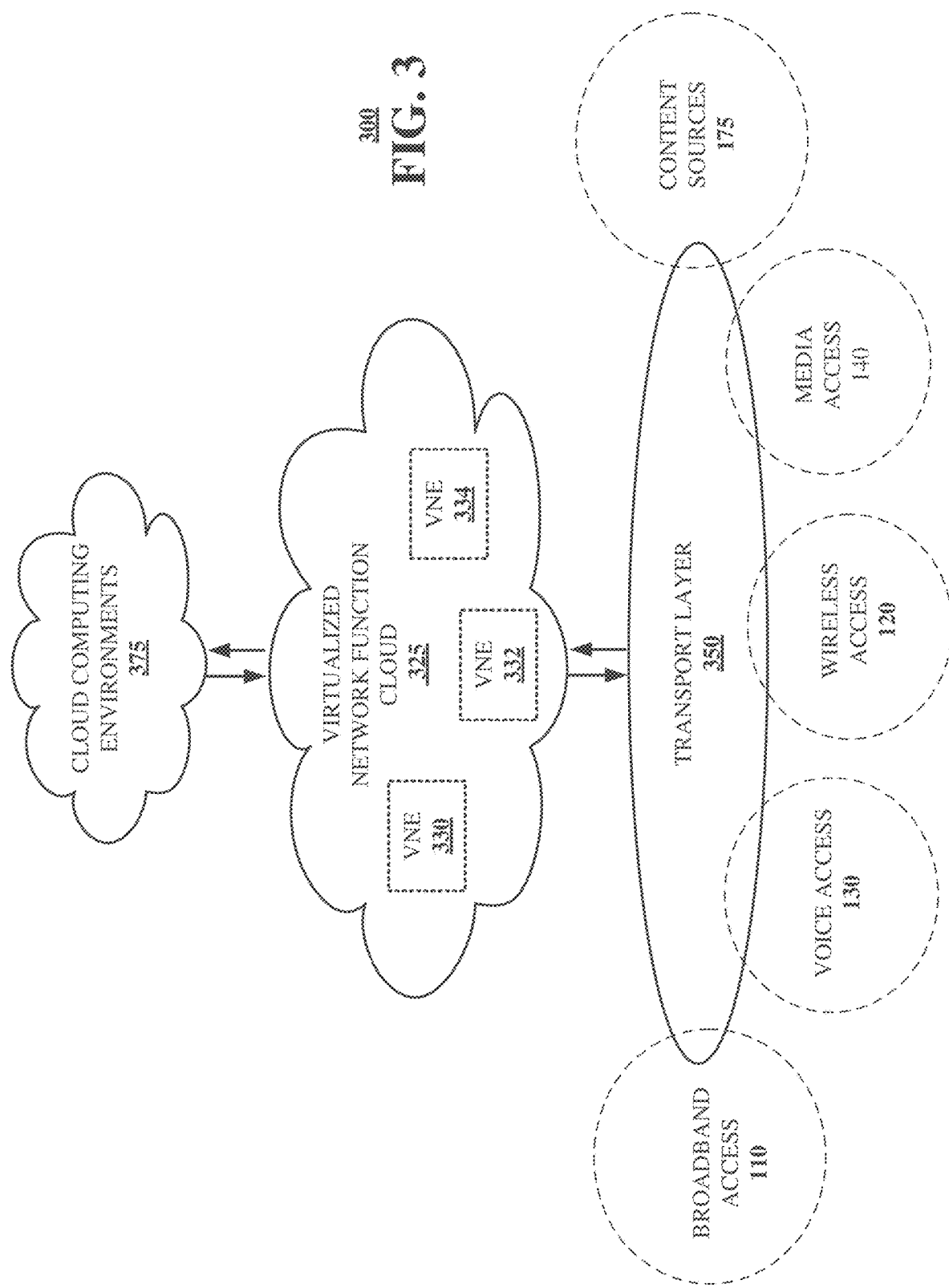

ENHANCED NETWORK WITH DATA FLOW DIFFERENTIATION

CROSS REFERENCE TO RELATED APPLICATION(S)

This application is a continuation of U.S. patent application Ser. No. 17/173,802, filed on Feb. 11, 2021. All sections of the aforementioned application(s) and/or patent(s) are incorporated herein by reference in their entirety.

FIELD OF THE DISCLOSURE

The subject disclosure relates to an enhanced network with data flow differentiation.

BACKGROUND

Traffic flow in wireless networks is a mix of different types of data and different amounts of data.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
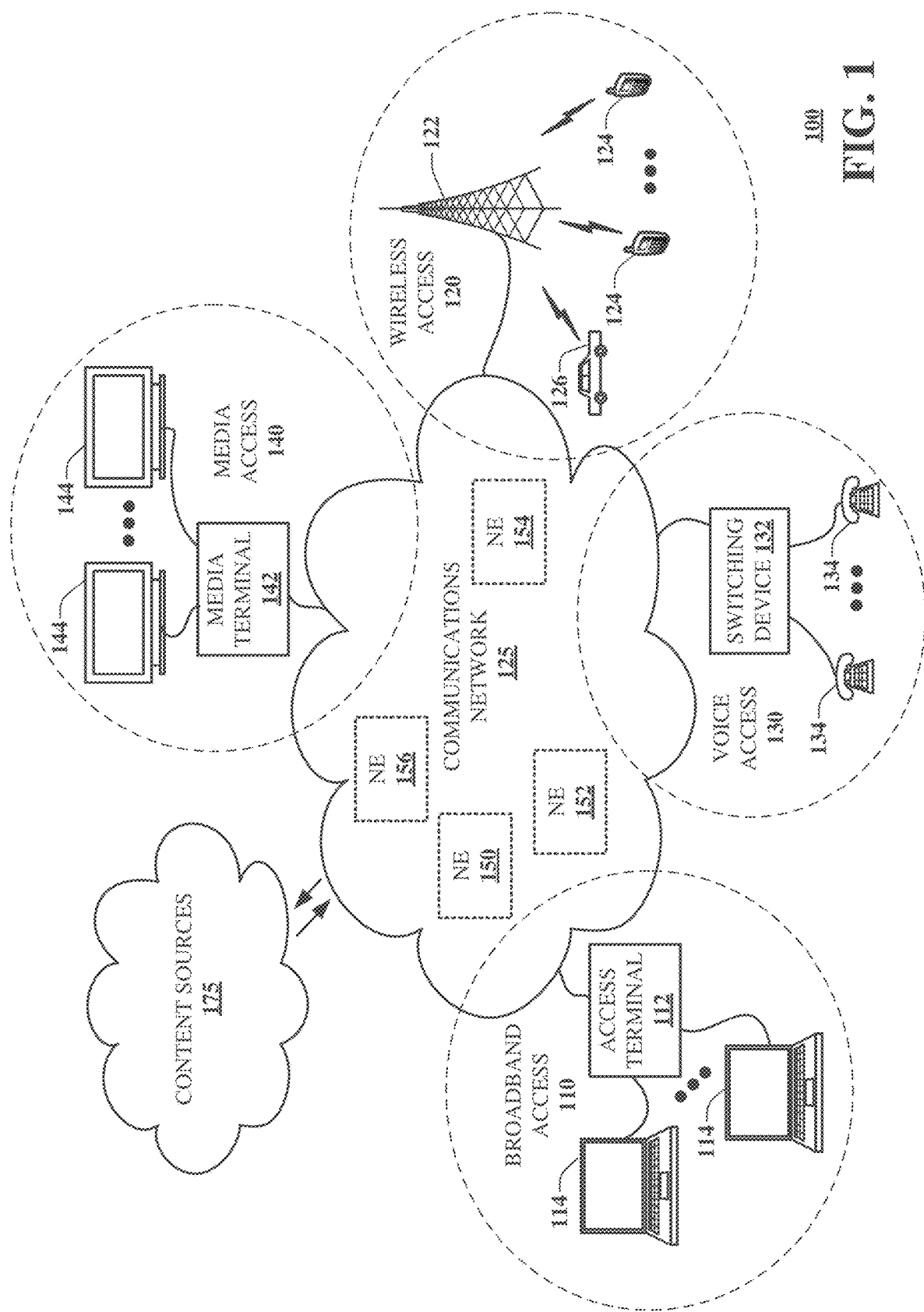
FIG. 1 is a block diagram illustrating an exemplary, non-limiting embodiment of a communications network in accordance with various aspects described herein.

The subject disclosure describes, among other things, illustrative embodiments for enhancing network performance through differentiation of small and large data flows. This unique idea is based on a finding that large data flows are relatively insensitive to prioritization but the small flows respond to receiving a higher priority and being communicated according to that priority over a network.

Consequently when the small flows are prioritized, overall network throughput will improve. This mechanism may be implemented directly in a radio access network and may take advantage of an embedded scheduler in the radio access network to perform differentiation of data flows according to relative size. The idea may be extended to widest variety of radio access networks and technologies. Therefore it can be used in networks such as 4G, 5G and beyond. Other embodiments are described in the subject disclosure.

One or more aspects of the subject disclosure include receiving, by a processing system including a processor, a plurality of data traffic flows at a radio access network, each respective data traffic flow of the plurality of data traffic flows for radio communication between the radio access network and respective user equipment, classifying the each respective data traffic flow as a large data traffic flow or a small data traffic flow and assigning a priority to the each respective data traffic flow. In embodiments, assigning a priority comprises assigning a relatively lower priority to the each respective data traffic flow responsive to the classifying the each respective data traffic flow as a large data traffic flow and assigning a relatively higher priority to the each respective data traffic flow responsive to the classifying the each respective data traffic flow as a small data traffic flow. Other aspects of the subject disclosure include assigning communication resources to the each respective data traffic flow according to an assigned priority of the each respective data traffic flow and communicating the each respective data traffic flow to the respective user equipment responsive to the assigning communication resources.

One or more aspects of the subject disclosure include a radio access network which includes a processing system operable for receiving information about a data flow for radio communication between a radio access network and user equipment, classifying the data flow as one of a large data flow and a small data flow and adjusting priority of the data flow to produce an adjusted priority, wherein adjusting priority comprises reducing relative priority of the data flow responsive to classifying the data flow as a large data flow. Other aspects of the subject embodiment include communicating data including the data flow between the radio access network and the user equipment according to the adjusted priority.

One or more aspects of the subject disclosure include classifying data flows as a large data flow or a small data flow, wherein the data flows are assigned for radio communication between a radio access network and user equipment in an area served by the radio access network, and wherein the classifying is based on a predetermined size criterion. Other aspects of the subject disclosure include reducing priority of data flows classified as large data flows relative to priority of data flows classified as small data flows so that the data flows classified as small data flows have priority for radio communication between the radio access network and the user equipment, scheduling the data flows for radio communication, including assigning radio resources to the data flows according to priorities of the data flows and communicating the data flows between the radio access network and the user equipment based on assigned radio resources.

Referring now to FIG. 1, a block diagram is shown illustrating an example, non-limiting embodiment of a system 100 in accordance with various aspects described herein. For example, system 100 can facilitate in whole or in part receiving a data flow for radio transmission and determining whether the data flow is a large data flow or a small data flow. Large data flows are given a reduced priority when scheduling communication of data flows so that overall performance of a communication network is improved. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Data traffic in wireless networks such as the networks of communications network 125 of FIG. 1 generally is a mix of different types of data traffic, with different characteristics. Types of data traffic may include, for example, video data, voice data, file data and webpage data. Video data is generally a data file or streaming data of indeterminate length. Video data may include a video file such as a film or other recorded video segment, having a predetermined file size and encoded in some format such as MP4. Video data may also include a stream of encoded video such as a live broadcast available over a network and with an indeterminate size. Such video may continue streaming until the video ends or the viewer terminates the stream.

Voice data comprises data representative of human speech, such as during a telephone call between a mobile device and a base station or other network element. Voice data may be of indeterminate duration, lasting as long as a telephone call lasts between parties. Voice data may be prioritized in some networks over other types of data so that the voice data is handled without apparent delay or distortion for the parties on the call.

File data is data representative contained in a file or other predetermined segment having a predetermined file size or file duration for transmission. For communication, the file data may be prepended or appended with header information and other data for control and signaling purposes. File data may include other types of data, such as video data or encoded audio data.

Webpage data includes information transmitted over a network to a user device to render a webpage on the user device. Such data may include other types of data such as graphics, video, audio and text data. Further, such webpage data may include ad calls or other data that prompts the webpage to submit a request for additional data. An example is an ad call to request a banner advertisement of a particular size for a particular location on a webpage. The ad call may prompt a remote auction for the opportunity to display an ad at the location on the webpage and, following the auction, cause the data forming the ad data to be communicated to the user device. The ad data, in turn, may include video data, audio data, graphics, text and other types of data. A single webpage may have dozens of ad calls and other prompts for more data that must be filled to fully render the webpage.

Some traffic, such as voice data and video data, are isochronous and require timing coordination of the data source and the user device. The data must be delivered consistently and without undue delay to prevent distortion or other failures in reliability. Other traffic is asynchronous data which originates in process that proceed independently. File data or webpage data may be examples of asynchronous data. Other traffic may be synchronous data which pertains to process which have interrelated timing. Some webpage data, such as ad calls, may be synchronous data.

Even the same type of traffic can be further distinguished by the sizes of particular traffic flows. In general, traffic may be considered to include large traffic flows and small traffic flows. The threshold between large traffic flows and small traffic flows may be chosen to be any convenient value, depending on circumstances, implementation and other factors, and may vary dynamically. It has been observed that in at least one wireless data network, a majority of data transactions, such as approximately ninety percent of data transactions, in the network are relatively small transactions with file size less than 200 KBytes. In contrast, a small number of data transactions, approximately ten percent in the example, dominate the traffic volume, representing more than fifty percent of total data traffic volume.

While division into large data flows and small data flows is appropriate for some applications and embodiments, in other embodiments, further divisions may be appropriate. For example, in some applications, it may make sense to divide data flows into small, medium and large data flows, with the thresholds set based on empirical data, current circumstances or network traffic, or any other suitable factor. Moreover, the thresholds between sizes of data flows may be fixed or be set dynamically. For example, a threshold value may be set according to overall traffic throughput in the network or a portion of the network, and may vary with time of day, geography, identity or status of users, or other factors. A threshold between a large data flow and a small data flow may be 200 KBytes during business hours, 9:00 AM to 5:00 PM, but may be changed to 500 KBytes during other times of the day. Similarly, a threshold between small data flows and large data flows may be set at 500 KBytes for suburban, residential areas and may be set at 5 MBytes for a central business district or suburban office park. The threshold may be set by any suitable party such as the operator of a wireless data network.

Still further, the relative size of a data flow may depend on the type of data. For example, if the data is of type video and a user is streaming a video file for a lengthy film or broadcast program, the amount of data may be considered quite large if the entire video file is streamed, even though the viewer may actually view only a few seconds of the program. From the initiation of transmission of the data flow, its true size may be unknown but its classification as to relative size may be based on its potential, such as large in the case of a video file that may be entirely streamed by the viewer. In other examples, the size of a data file, such as a web page, may be relatively reliably known before transfer and the classification as to relative size may be done with greater confidence. The description of large data flows and data flows is intended to be descriptive only and will vary with time, location and other circumstances.

In conventional networks, data flows are generally not distinguished by size of the data flow. Conventionally, data flows are distinguished by a user's class, where the user is, for example, an end user in a wireless network who has requested delivery of the data flow from a remote source. The request may be for a video data flow, for data such as a webpage including advertisement data and other data calls to populate the webpage or for voice data for a voice call. The user or the data flow of a user, is associated with or defined by a class. Specific data flows are associated with specific Quality of Service (QOS) Class Identifier ("QCI") classes. This is established in network operators' practice. In 3GPP standards, however, one user may transmit its data in different QCI classes. For example, one user may have both QCI8 and QCI9 traffic at the same time. Thus, the class may be assigned by the network operator or any other suitable participant in the network.

One example of a class to distinguish user data flows is a Quality of Service (QOS) Class Identifier ("QCI"). In an example, 3GPP Long Term Evolution (LTE) networks define a QoS for different bearer traffic. To define a QoS for particular traffic, a QCI is assigned to the traffic flows. Each respective user is associated with an assigned QCI class. The QCI is a scalar that is used within the access network, such as an eNodeB, as a reference to node-specific parameters that control packet forwarding treatment such as scheduling weight, admission thresholds and link-layer protocol configuration. The eNodeB includes a module termed a scheduler that responds to, among other features, the QCI of a packet to process the packet along with other packets in the eNodeB. The QCI class ensures that data traffic in the network is handled appropriately, such as given sufficient priority according to the nature of the data traffic. Examples of QoS parameters include Guaranteed Bit Rate (GBR) and non-Guaranteed Bit Rate (non-GBR), Priority Handling, Packet Delay Budget and Packet Error Loss rate. Generally, QCI classes are designated QCI1 through QCI9. Others are defined as well.

Other examples and classifications may be specified for other types of networks. For example, LTE is generally considered a fourth generation or 4G network. Subsequently developed networks such as 5G networks may use similar data classification schemes for handling data traffic. The LTE QCI scheme is used as an exemplary embodiment herein, but the example may be readily extended to other embodiments and different classification schemes as well.

Conventionally, users are distinguished by an assigned QCI class and a user's QCI class is established by a policy. In an example, a mobility network operator assigns a first QCI class such as QCI9 to pre-paid mobile customers, meaning those subscribers who pay for network access on a pre-paid or pay-as-you go basis, and the mobility network operator assigns a second QCI class such as QCI8 to post-paid mobile subscribers, or subscribers who have an ongoing contract for service. In this example, QCI8 data is non-GBR data and includes buffered streaming video data, TCP-based data, such as, for example, webpages, email, chat, file transfer protocol (FTP), and the like, and QCI9 data is non-GBR data and similarly includes buffered streaming video data, TCP-based data, such as, for example, webpages, email, chat, file transfer protocol (FTP), and the like. In an example, no matter what type of data flow a user is receiving or sending, the QCI classification for the user does not change and data flows are conventionally differentiated by QCI class. Other QCI classes may be defined and used, or not used, by network operators. LTE or 4G networks use QCI classes and define 9 QCI values. For 5G networks, a classification may be termed 5QI but is used similarly.

It has been found that if a network further differentiates the data traffic in the access network by data flow sizes, the overall performance of the network can be improved significantly. This is new because the 3GPP standards differentiate services only by QoS classes (QCI), but each class has large and small data flows. By differentiating the data traffic on top of the QoS classes a network can achieve better results in each QoS class, as well as the overall performance. There has been some research trying to differentiate the traffic based on applications or sizes, but the focus is mainly on doing so in the core network, meaning network elements communicating over fiber or cable or other high-speed data connection. Such implementations are far away from a radio access network (RAN) where data is delivered directly to the user.

In accordance with some embodiments, a method and apparatus classify data traffic into small and large transactions, and then assign different QCI weights to them. The new QCI weights are fed to a scheduler component of the radio access network, which will automatically prioritize the traffic by allocating different resources. Conventional solutions are implemented in the core network, and have to rely on a transmission control protocol (TCP) round trip time to estimate radio network conditions, for example. However, some embodiments of the method and apparatus directly reside in the RAN and can avoid the negative impact brought by the inaccuracies caused by that estimation process. Also, by directly working with the RAN scheduler, the embodiments of the method and apparatus can take advantage of the fairness guarantee of the scheduler to avoid dramatic negative impact on the de-prioritized flows.

In accordance with other embodiments, data flows may be classified by any convenient characteristic instead of or in addition to size of the data flow. For example, data flows may be classified according to the type of data they convey so that file data is given priority over video data. In another embodiment, video data having a size greater than a threshold may be given a lower priority than file data or webpage data also having a size greater than a given data threshold. In yet another example, data having a particular QoS requirement and also exceeding a size threshold. Different classifications may be prioritized so that, for example, a smaller data flow always has priority over larger data flows but, for competing data flows that both exceed the size threshold, one data type is prioritized over another data.

Figure 2A:
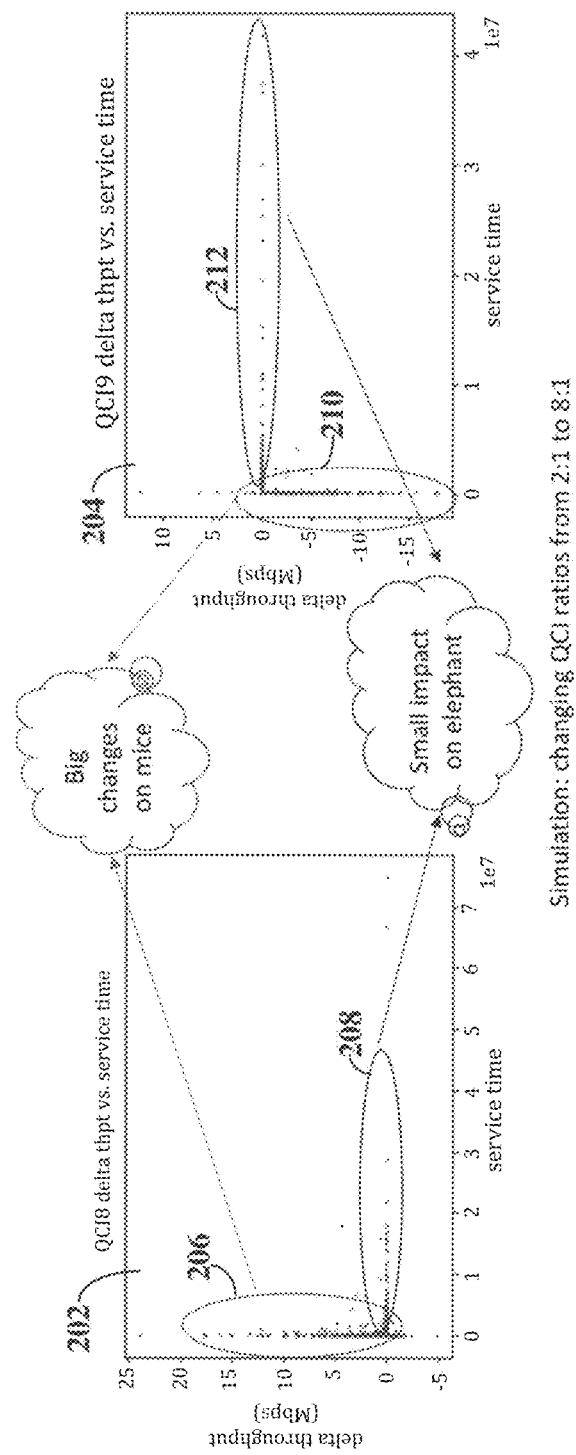
FIG. 2A is a block diagram illustrating simulated data throughput changes for large data flows and small data flows in different Quality of Service Class Identifier (QCI) classes when priorities between QCI classes are changed in a network such as the communication network of FIG. 1 in accordance with various aspects described herein.

FIG. 2A is a block diagram 200 illustrating simulated data throughput change for large data flows and small data flows in a network such as a communication network of the system 100 of FIG. 1 in accordance with various aspects described herein. In particular, FIG. 2A illustrates findings from simulations of network traffic where QCI weights between QCI8 and QCI9 were increased between 2:1 and 8:1. A first graph 202 illustrates delta or change in throughput versus service time for service class QCI8 in a simulated network. A second graph 204 illustrates delta or change in throughput versus service time for service class QCI9 in a simulated network. Throughput corresponds to the amount of data passing through a simulated network element such as an eNodeB.

In the first graph 202, users classified as QCI8 are assigned a relative priority of 2 and users classified as QCI9 are assigned a relative priority of 1. In the second graph 204, users classified as QCI8 are assigned a relative priority of 8 and users classified as QCI9 are assigned a relative priority of 1. For users classed as QCI8, there are simulated both large data flows and small data flows. Similarly, for users classed as QCI9, there are simulated both large data flows and small data flows. The abscissa, service time, reflects time required to process a particular data flow, in seconds, assuming that all network resources can be used for the particular data flow. Service time correlates with a relative size of a particular data flow, in Mb. Generally, larger service times correspond to larger files. The ordinate shows change (delta) in throughput as QCI ratios are changed from 2:1 to 8:1 for QCI8 to QCI9.

Graph 202, on the left hand side of FIG. 2A, indicates that, for this simulation, if a particular file size or data flow size is relatively small, meaning the particular data point is located near 0 on the service time access, the service time is relatively small, close to 0. If the file size is relatively small, the delta throughput is relatively large, illustrated by group 206. This indicates that performance is improved by a QCI ratio change of 2:1 to 8:1. The delta throughput is a number greater than 0. If file sizes are relatively large, meaning the particular point is away from the origin on the abscissa, data points for large file sizes are clustered around a consistent delta throughput value, illustrated by group 208. For the relatively large file sizes in group 208, their change in throughput is approximately 0 indicating that data flows having relative large sizes are insensitive to the change when QCI8 users are given higher priority, according to this simulation.

Graph 204, on the right hand side of FIG. 2A, shows an opposite result for small size flows. This graph 204 shows results for QCI9 users when priority for QCI8 and QCI9 users is changed from 2:1 to 8:1. Graph 204 indicates that, if a data flow is small, such as for the data points in group 210, there is a substantial degradation in performance. The delta throughput values are clustered at values less than 0, indicating worse performance for QCI9 users as QCI ratios are changed from 2:1 to 8:1, meaning QCI9 users are given lower priority in the simulated network.

Based on the simulation results of FIG. 2A, it can be concluded that relatively large data flows are insensitive to QCI weight changes. In that case, the large data flows can be given a relatively low priority. On the other hand, relatively small data flows can be substantially impacted, both positively, graph 202, where priority is increased, and negatively, graph 204, where priority is decreased. Further, it is apparent that high-priority large data flows will degrade low-priority small data flows when they are both present. Thus, giving large flows a high priority results in degraded performance. That is illustrated by the degradation on the right side of FIG. 2A in graph 204. Low-priority large data flows will boost performance or throughput of high-priority small data flows when they are both present. This is illustrated by the improvement on the left in graph 202. This suggests giving all large data flows relatively low priority and all small data flows relatively high priority. The threshold between large data flows and small data flows can be selected using any appropriate basis and can be varied based on particular circumstances. Such an implementation will improve overall performance without substantially degrading performance for any users, including users associated with the large data flows.

The simulation illustrated in FIG. 2A primarily applies when the system is relatively congested and when both QCI8 users and QCI9 users are present. At a high level, relative priority such as 2:1 and 8:1 may be considered to be the relative number of resources in a transmission that each QCI class gets. That is, when QCI8 has 2:1 priority over QCI9, a QCI8 data flow will be assigned twice as many resources in the network as a competing QCI9 data flow. Stated another way, the QCI8 user has twice as many opportunities to transmit data as the QCI9 user.

Figure 2B:
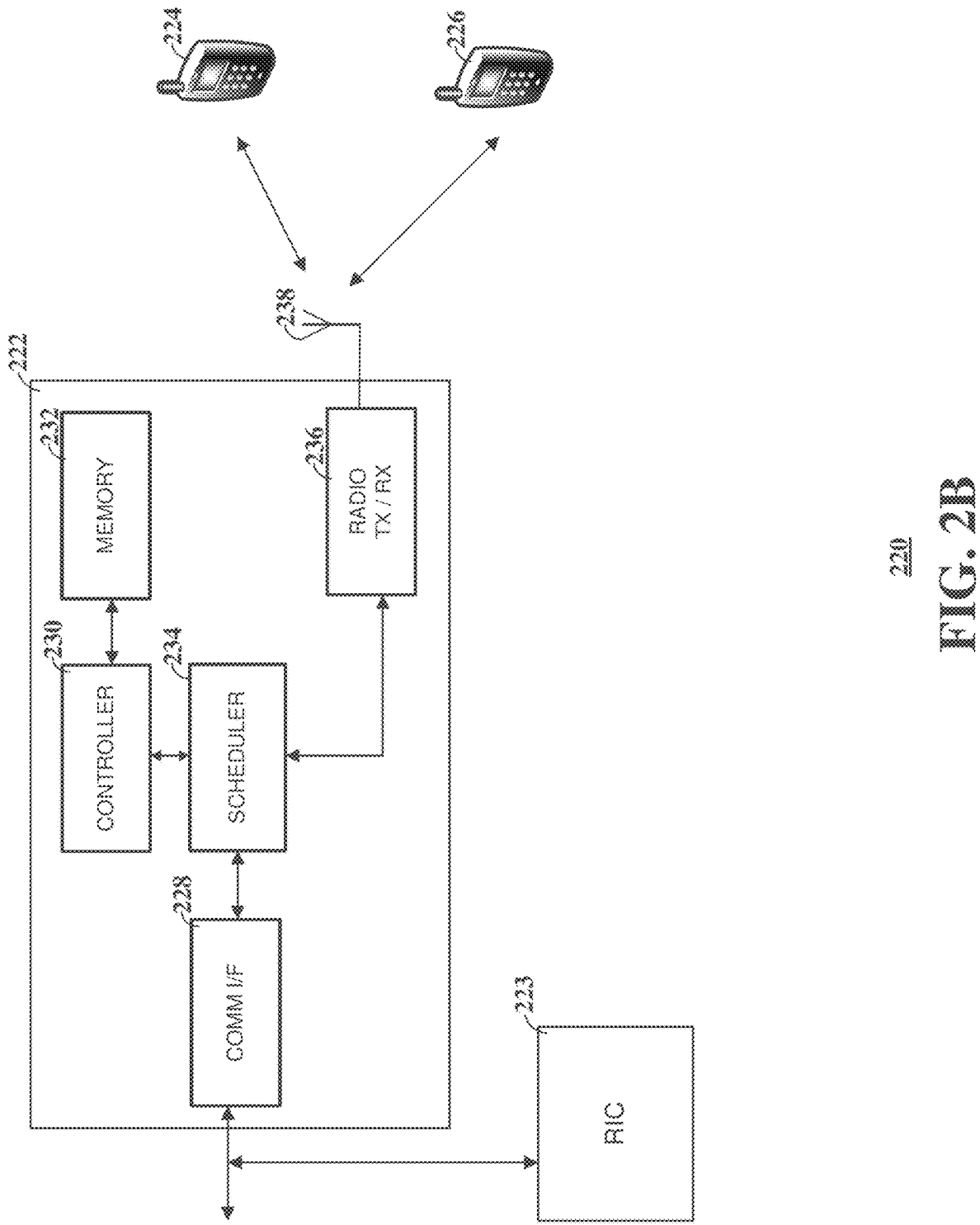
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a radio access network 220 functioning within the communication network of FIG. 1 in accordance with various aspects described herein. The system of FIG. 2B is an embodiment of a radio access network 220 providing radio communication services between a fixed device 222 and mobile devices including a first mobile device 224 and a second mobile device 226. In that regard, some embodiments of the radio access network 220 may be constituent elements of the wireless access 120 shown in FIG. 1.

The fixed device 222 in the illustrated embodiment may include an eNodeB or other base station. The fixed device may be in communication or in some instances form a part of a Radio Access Network interface controller (RIC) 223. The fixed device 222 provides radio communication in a geographic area near the fixed device for radios including the first mobile device 224 and the second mobile device 226. The radio communication may include various data, including voice data, video data, file data and webpage data. Communication between the fixed device 222 and a mobile device such as the first mobile device 224 and the second mobile device 226 may be handed off from the fixed device 222 to a similar fixed device (not shown) serving an adjacent geographic area to maintain continuous communication with the mobile device.

The first mobile device 224 and the second mobile device 226 may include any suitable radio device or equipment including a radio for communication with the fixed device 222. The first mobile device 224 and the second mobile device 226 are examples of user equipment or UE. In the illustrated embodiment, the first mobile device 224 and the second mobile device 226 are embodied as smart phones with ability to carry on a voice communication with a remote party over a radio link with the fixed device. The first mobile device 224 and the second mobile device 226, when embodied as smart phones or other devices, may receive from the fixed device 222 video data and display images on a video screen and play audio on a speaker. The video data may be of predetermined size, such as a pre-recorded video file, or of indeterminate size such as a live broadcast or stream of video content. Further, the first mobile device 224 and the second mobile device 226 may include a web browser for browsing web pages and therefore are configured to receive from the fixed device 222 webpage data. The webpage data may include one or more ad calls or other requests for additional data to populate a web page displayed on the mobile device. The first mobile device 224 and the second mobile device 226 may further receive file data or data having a predetermined file size. The data received by the first mobile device 224 and the second mobile device 226 from the fixed device 222 on a downlink, and data provided by the first mobile device 224 and the second mobile device 226 to the fixed device on an uplink, may vary in file size or flow size.

Communication between the fixed device 222 and other radios such as the first mobile device 224 and the second mobile device 226 is according to one or more communication protocols. Such communication protocols define aspects of the communication such as physical layer features like frequency and bandwidth and transport layer features such as packet organization. Examples of suitable protocols include fourth generation cellular, referred to as 4G or LTE, and fifth generation cellular referred to as 5G. Future-developed communication protocols, and other types of communication protocols including wireline and wireless communication protocols, by be used as well, and the concepts described herein extended thereto.

In an embodiment, the fixed device 222 includes a communication interface includes a communication interface 228, a controller 230, a memory 232, a scheduler 234, a radio transceiver 236 and an antenna 238. These components, and others, may communicate data in any suitable manner, such as using one or more data buses and data communication protocols. The embodiment of FIG. 2B is intended to be exemplary only. Other embodiments will include other or additional features and provide additional functionality to the functionality described herein.

The communication interface 228 provides data communication with other network components. In an embodiment, the fixed device is an eNodeB providing radio communication to radios in a geographic area. The communication interface 228 provides data communication to other, similar eNodeB elements, to components such as a radio access network interface controller (RAN IC) and to a core network. The core network provide communication to still other networks including the internet. Data communicated by the communications interface 228 may include video data, voice data, file data and webpage data, and the data may have various formats, encodings and sizes. For example, video data may be encoded according to a standard such as MP4 and may include streaming video data of indeterminate size or video files of predetermined size. The communication interface 228 may include a processing system including one or more processors and memory.

The controller 230 provides control functions for the fixed device 222. The controller may include one or more processing systems, each including one or more processors and memory for storing data and instructions. Similarly, the memory 232 may store data and instructions for use by the controller 230 and other components of the fixed device 222.

The scheduler 234 controls radio communication with radio devices such as the first mobile device 224 and the second mobile device 226. The scheduler 234 operates to decide which devices should be given resources, or resource blocks, and how much resources should be given to each device to send or receive data. The scheduler 234 receives as inputs data flows as well as information such as QCI, to make decisions about assignment of resources to the data flows. Among other functions, the scheduler 234 allocates air interface resources to selected active users based on QCI and other aspects. The scheduler 234 determines a ranking among users and data flows. QCI weight will change the ranking. In an example, the scheduler 234 may decide which user or user device to give priority to, based on various factors. The scheduler 234 may assign more subframes or packets to a particular user or user device in favor of another user or device.

Within the RAN, or within an eNodeB, the output of the scheduler 234 is used to determine what data flow is sent to which user equipment at what time on a downlink to the user equipment. For the user equipment, the scheduler 234 further determines a priority for transmission on an uplink from the user equipment and communicates information about that priority. The scheduler has access to RAN statistics, such as congestion levels, to use in assigning priorities.

In an embodiment, the scheduler 234 is classified as a proportional fair scheduler. A proportional fair scheduler applying a proportional fair process operates to strike a balance between round robin scheduling and a maximized channel quality information. Typically, round robin scheduling schedules communication with UEs in a round robin, equal access fashion. Maximized channel quality information typically prioritizes UEs based on current channel quality. The proportional fair scheduler considers resource fairness as well as maximizing cell throughput. Other types of scheduler may be used or adapted as well.

The radio transceiver 236 and the antenna 238 enable radio communication over a radio channel with radio devices such as the first mobile device 224 and the second mobile device 226. The radio transceiver 236 may include components and functions such as a modulator/demodulator, an oscillator, a power amplifier, and an analog front end to drive the antenna 238 to generate suitable electromagnetic signals for communicating with radios including the first mobile device 224 and the second mobile device 226.

Figure 2C:
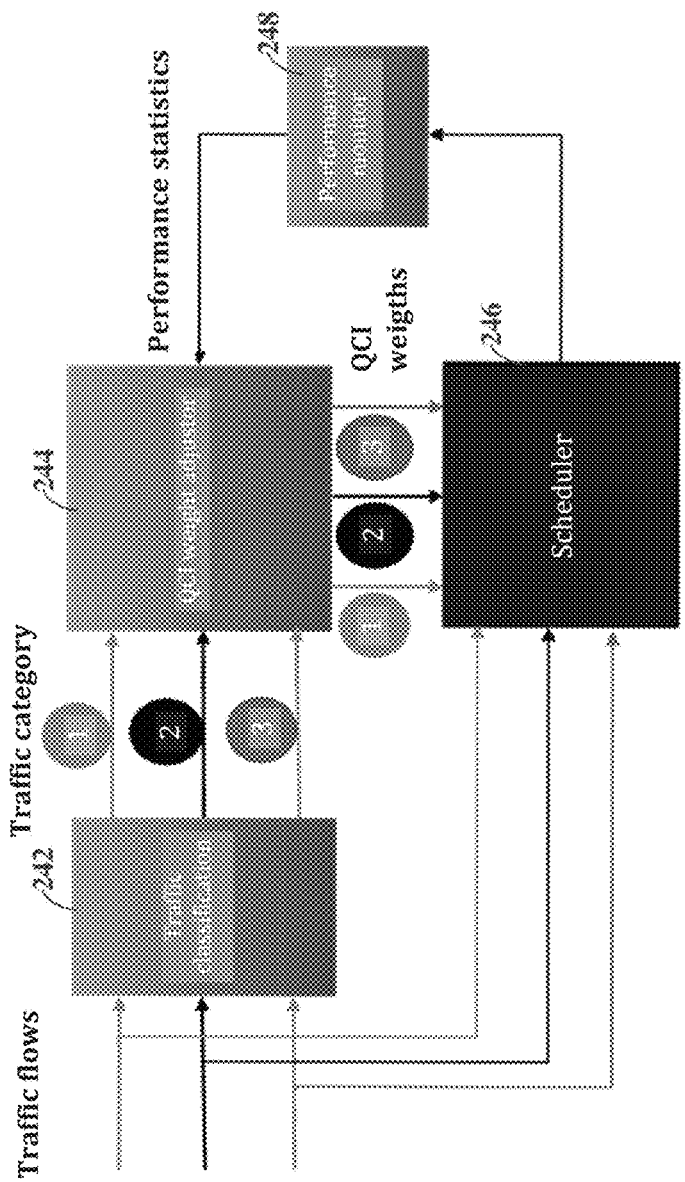
FIG. 2C is a block diagram illustrating an example, non-limiting embodiment of a system functioning within the communication network of FIG. 1 in accordance with various aspects described herein.
Figure 2D:
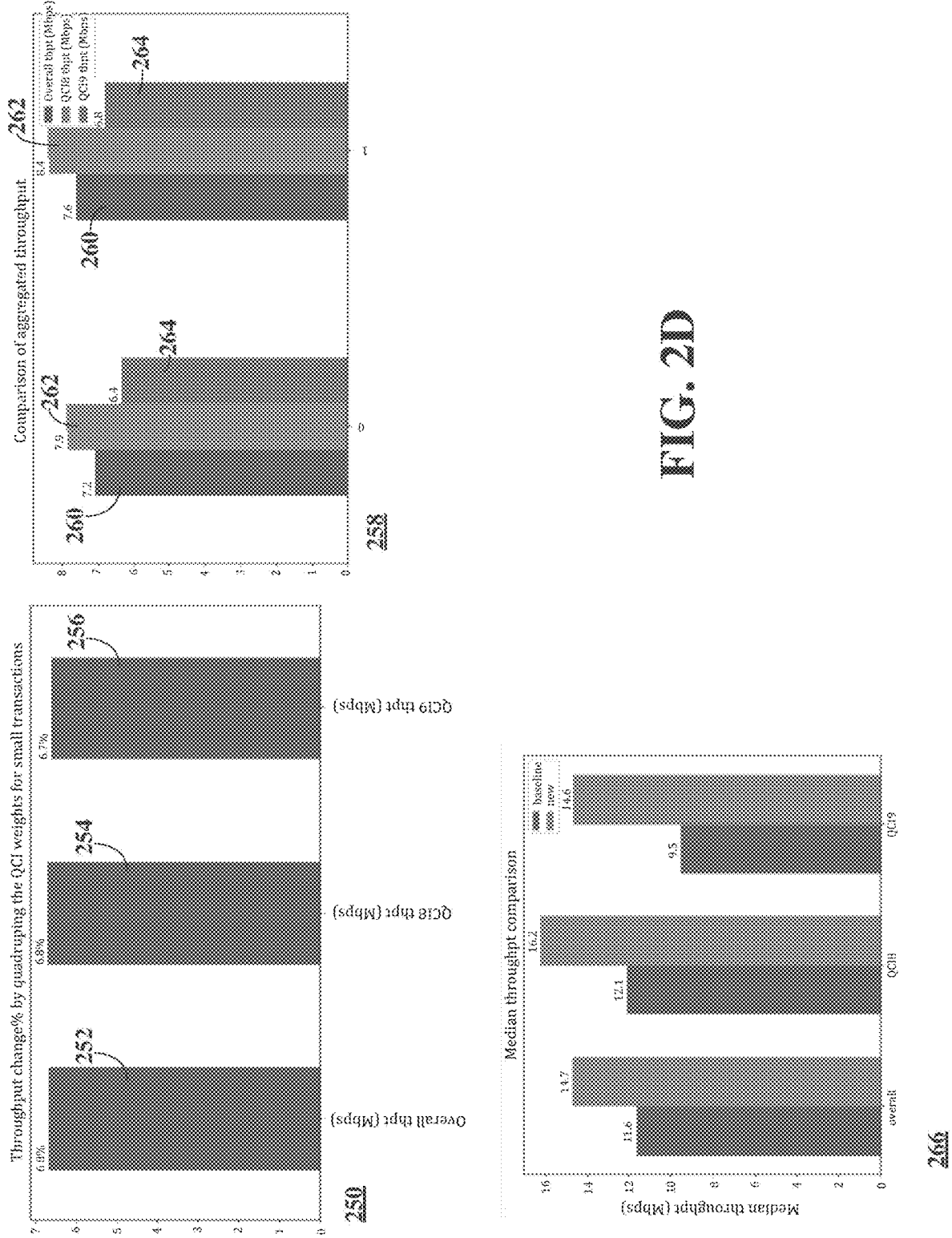
FIG. 2D is a diagram illustrating simulation results for an example, non-limiting embodiment of a system in accordance with various aspects described herein.

FIG. 2C is a block diagram illustrating an example, non-limiting embodiment of a system 240 functioning within the communication network of FIG. 1 in accordance with various aspects described herein. FIG. 2C illustrates a portion of a fixed device such as fixed device 222 of FIG. 2C that may be used to provide data communication in a network such as wireless access 120 of FIG. 1. In the embodiment of FIG. 2D, system 240 includes a traffic classifier 242, a weight adjustor 244, a scheduler 246 and a performance monitor 248. Other embodiments may include additional or alternative components or functionality to that shown in FIG. 2C.

The traffic in the wireless networks such as those illustrated in FIG. 1 and FIG. 2C is a mix of different types with different characteristics. Even the same type of traffic can be further distinguished by the sizes of traffic flows. It has been found that if the traffic is further differentiated by flow sizes, the overall network performance can be improved significantly. This is new because the 3GPP standards, for example, differentiate services only by QoS classes, but each class has large and small data flows. In accordance with various aspects described herein, the traffic is differentiated on top of the QoS classes and can achieve better results in each QoS class, as well as improved overall performance.

In some conventional networks, it was proposed to differentiate large and small data flows in the core network, away from the radio access network. For example, a mechanism could be implemented in packet data network gateway (P-GW) of the core network to detect, buffer and delay large data flows. The mechanism could promote or prioritize small data flows when network congestion occurs. However, as indicated, the problem arises when cells are congested, but this implementation is located far away in the network from the radio access network (RAN). Components in the core network may not have good data about the status of the RAN because there are no feedback channels from the RAN to the core network. As a result, any such core implementation has to estimate RAN performance using metrics such as TCP round trip time. However, such metrics are not always reliably accurate. This inaccuracy will have a direct negative impact on large data flows because flows are intentionally slowed down or de-prioritized.

In accordance with various aspects described herein, the traffic is classified into small and large transactions, and then assigned different QCI weights. The new weights are provided to a RAN scheduler in an eNodeB, for example, which will automatically prioritize the traffic by allocating different resources. Compared to conventional solutions implemented in the core network, which have to rely on a TCP round trip time to estimate radio network conditions, the system in accordance with embodiments herein may directly reside in the RAN and can avoid the negative impact brought by the inaccuracies caused by that conventional inference process. The scheduler has first-hand information about congestion and other traffic conditions in the RAN and that information can be used to control the traffic classification. Also, by directly working with the scheduler, a system and method in accordance with embodiments herein can take advantage of the fairness guarantee of the proportional fair scheduler to avoid dramatic negative impact on the de-prioritized flows. The negative impact on large flows is relative and not absolute. When there is no congestion, the de-prioritization does not degrade performance of large data flows. When congestion does occur, the scheduler does de-prioritize large flows. But because the scheduler applies a fairness criterion, it will not starve the large flows to the extent that such flows are never communicated.

The embodiments described herein are relatively simple to implement and do not require an extra server to store or buffer the data. Therefore, these embodiments do not introduce extra delay in the process. The embodiments rely on ability of the scheduler to guarantee fairness among different data flows. Accordingly, the system and method do not risk dramatic negative impact to the de-prioritized flows like other mechanisms do. A system and method in accordance with the disclosed embodiments will improve the network performance for all QoS classes, and the overall performance as well. This may reduce capital expenditure required of a network operator by deferring installation of additional equipment in the network.

In conventional radio access networks, service differentiation is performed using different QCI classes. Each QCI class typically has mixed traffic types and sizes. The same QCI priorities are applied on all flows in a single QCI class to both large data flows and small data flows. The QCI categorization is ad hoc or is based on rules or policies of network operator or a cellular service plan purchased by a customer. In some cases, a user can buy into a better plan featuring higher QCI priority.

To improve overall performance, in a first embodiment, traffic of different sizes can be allocated to different QCI classes. For example, large data flows may be allocated to a lower priority QCI class. Similarly, small data flows may be allocated to a higher priority QCI class. Thus, in an example, small data flows are always classified as QCI8 and large data flows are always classified as QCI9.

Allocation may include, for example a step of comparing a flow size for the data flow with a threshold in order to classify the data flow as a large data flow or a small data flow. More than two categories, small and large may be used in some examples. For example, categories small, medium and large data flows may be used, with two thresholds distinguishing the three categories. Further, the threshold between large data flows and small data flows may be static or dynamic. For example, the network operator may have a respective predetermined data size threshold for each respective RAN or eNodeB in a network, or for respective times of day or respective days of the week. The respective thresholds may be varied depending on factors such as relative traffic level or congestion in the RAN or in neighboring RANs. If the RAN is not congested, or if traffic congestion is less than a threshold, the classifying and reducing the priority of large data flows may be omitted. Thus, the threshold value may be determined based on a current time, a current location of the radio access network or a current traffic level.

A second embodiment permits maintenance differentiation among QCI classes but still improve overall performance. In this embodiment, a second level of differentiation is added within each QCI class. Thus, for large data flows and small data flows within each QCI class, different weights may be applied within the QCI class. Thus, large data traffic flows will be assigned a weight which reduces their priority, such as a weight of 0.25 or 0.5 relative to a nominal value of 1.0. The small data traffic flows maintain the same nominal weight of 1.0 or may have their weights increased, for example to 1.25 or 1.5 so that the small data traffic flows have a relatively higher priority and the large data traffic flows have a relatively lower priority. Either the first embodiment or the second embodiment operates to increase the QCI weight for small data flows and to decrease the QCI weight for large data flows.

Referring again to FIG. 2C, one or more traffic flows are received at traffic classifier 242 and at scheduler 246. The traffic flows may include any type of data for transmission over the radio access network to user equipment. For example, the traffic flows may include video data, voice data, file data and webpage data, and other types of data as well. The traffic classifier 242 operates to determine if each respective data flow is a large data flow or a small data flow. Any suitable classification algorithm may be used by the traffic classifier 242 to classify each data flow. For example, information about the size of each respective data flow may be compared with one or more thresholds to classify each respective data flow. In another example, a machine learning (ML) algorithm or process may be implemented to classify the data flows. One example of a suitable ML process is described in U.S. Pat. No. 10,772,016, issued Sep. 8, 2020 and incorporated herein in its entirety.

In an example, the traffic classifier 242 treats all data flows as small data flows while monitoring the size of each respective data flow. The traffic classifier 242 monitors the size or volume of the data flow over time. For example, video data of a live broadcast or streaming video presentation may be of unknown size at the time the first data is received. Or, the system 240 may not know how long the video will be streamed, for example if the viewer at the user equipment will discontinue viewing and downloading the video data. If the viewer continues viewing so that the data exceeds a threshold value, the traffic classifier 242 may re-classify the video stream as a large data flow. The traffic classifier 242 compares the volume of the data flow with a threshold value, which may be static or dynamic and may be established in any suitable manner. For example, the network operator may set the threshold at 500 Kbytes or 2 Mbytes of data. Once the data flow, as monitored by the traffic classifier 242, exceeds the threshold, the data flow is reclassified as a large data flow.

The traffic classifier 242 determines a size classification for each respective data flow received by the traffic classifier 242. The traffic classifier 242 provides the size classification to the weight adjustor 244.

The weight adjustor 244 receives the size classification and operates to adjust the QCI weight of each respective data flow according to the size classification. In general, the QCI weights of each respective data flow are adjusted to favor relatively small data flows and to de-prioritize relatively large data flows. Small data flows are favored over large data flows.

Any suitable weight adjustment algorithm may be used by the weight adjustor 244. In a first example, the weight adjustor 244 pre-determines a relatively high QCI weight for small data flows and a relatively low QCI weight for large data flows. The weight adjustor 244 assigns the specific weights of each data flow once the categories, large or small, are determined by and received from the traffic classifier 242. A data flow determined by the traffic classifier 242 to be a small data flow according to its size classification is assigned by the weight adjustor 244 to a predetermined QCI class, such as QCI class QCI8. Similarly, a data flow determined by the traffic classifier 242 to be a large data flow according to its size classification is assigned by the weight adjustor 244 to a predetermined QCI class, such as QCI class QCI9. The weight adjustor 244 determines weight information for each data flow.

In a second example, the weight adjustor 244 uses predefined QCI weights for each QCI class. The QCI weights may be the weights used conventionally or they may be new weights selected for small data flows. However, if the traffic classifier 242 detects a large data flow and advises the weight adjustor 244, the weight adjustor responds by decreasing the QCI weight of the large data flow from the predetermined QCI weights to some fraction of the predetermined QCI weights, such as 0.5 or 0.25. This will ensure that the large data flow will receive a lower priority so that overall network performance will be improved. In yet other embodiments, the QCI weights set by the weight adjustor 244 may be set and revised dynamically. A default value may be established initially. However, in response to feedback from the performance monitor 248, the weight adjustor 244 may revise the weights applied to large data flows, small data flows or both.

The scheduler 246 receives the weight information from the weight adjustor 244 and determines a priority for each data flow. In general, small data flows are favored over large data flows. The scheduler 246 determines priority for data flows on downlinks to user equipment and on uplinks from user equipment to the RAN. The priority information for uplinks may be communicated by the scheduler to the user equipment on a downlink transmission for subsequent use by the user equipment.

Embodiments of the system 240 may use any suitable scheduler algorithm for the scheduler 246. The scheduler 246 applies QCI weights for service differentiation. It has been observed that most contemporary scheduler algorithms adopt some variant of proportional fair scheduling principles and the embodiments of system 240 work well with such schedulers. In general, a proportional fair scheduler in a radio access network determines a priority for each user or user equipment served by the RAN at each resource block. The highest priority user is assigned to the current resource block. The user with the next highest priority is assigned to the next resource block until all resource blocks are assigned or all users have been served. The proportional fair scheduler is preferred because it can avoid the drawbacks of conventional systems. First, when the cells are not really congested, the decreased QCI weight for large data flows does not cause much change to the performance, because the competition among flows is slim and the QCI weight difference is not playing a big role in resource allocation. Second, a proportional fair scheduler guarantees certain fairness to all flows, so that the decreased QCI weight wouldn't cause substantial burden to large flows, because their allocated resource will be automatically increased by the scheduler 246 when their performance is low.

Thus, in accordance with the illustrated embodiments, the scheduler 246 handles fairness aspects of data communication in the system 240. The scheduler 246 employs a preexisting routine for ensuring fairness among users independent of data flow size. If the system 240 delays a large data flow, then decisions must be made, including how much to delay and when to delay the large data flow and let the small data flows continue. If a user associated with large data flows begins to experience excessive delay or degraded performance because of the categorization and de-prioritization, the proportional fairness scheduler process will recognize the delay or degradation and adjust priorities to compensate. The proportional fairness scheduler process uses as inputs current conditions, QCI weight and historical throughput for each user and develops a new ranking.

The performance monitor 248 receives information about performance of the system 240 and provides and input the weight adjustor 244. The performance monitor 248 provides a feedback loop and control function. For example, the performance monitor 248 may receive information about a particular performance parameter of key performance indicator, and also receive or retrieve a threshold value for the performance parameter. The performance monitor 248 can compare the performance parameter with the threshold value and, if the performance parameter exceeds the threshold value, the performance monitor can provide a feedback signal to the weight adjustor 244. The weight adjustor 244 can respond by varying its operation or suspending its operation completely for a given time period. Further, the feedback signal provided by the performance monitor 248 to the weight adjustor 244 may operate as a fine tuning adjustment to the weight adjustor. Such an arrangement is used when the QCI weights set by the weight adjustor 244 are changed dynamically. Any outcome of the weight selection or adjustment by the weight adjustor will be reflected in the performance monitored by the performance monitor 248. If the performance is impacted negatively and is determined to be due to dramatic QCI weight change, the QCI weights can be rolled back to mitigate the impact. For example, if the weight adjustor is weighting one aspect of the QCI values too high or too low, that may be detected in the output of the scheduler 246 by the performance monitor 248 and a suitable feedback signal may be applied by the performance monitor 248 to the weight adjustor 244.

FIG. 2D is a diagram illustrating simulation results for an example, non-limiting embodiment of a system in accordance with various aspects described herein. The simulation results of FIG. 2D correspond to a simulation of a radio access network with 57% loading, corresponding to moderate loading or congestion in the network. The simulation results in FIG. 2D further correspond to an original QCI8/QCI9 ratio of 2:1. For this simulation, within each QCI, small data flows or transactions given four times the priority of large data flows, corresponding to a weighting for large data flows in QCI9 of 0.25. In this simulation, small data flows are defined to be less than 2 MBytes in size.

The graph 250 shows throughput change-percent achieved by quadrupling the QCI weights for small transactions. According to data point 252, overall throughput improved by 6.8%. According to data point 254, QCI8 throughput increased by 6.8% and QCI9 throughput increased by 6.7%. The graph 258 shows a comparison of aggregated throughput in Mbps for overall throughput 260, QCI8 throughput 262 and QCI9 throughput 264. The bars on the left of graph 258 labelled 0 correspond to the original simulation, before the enhancement, and the bars on the right of graph 258 labelled 1 correspond to the simulation with the enhancement in place. The graph 266 shows a comparison of median throughput in Mbps for baseline (left bar in each pair) and for the new implementation (right bar in each pair). For both QCI8 and QCI9 classes, approximately 30% improvement is seen in median throughput.

Figure 2E:
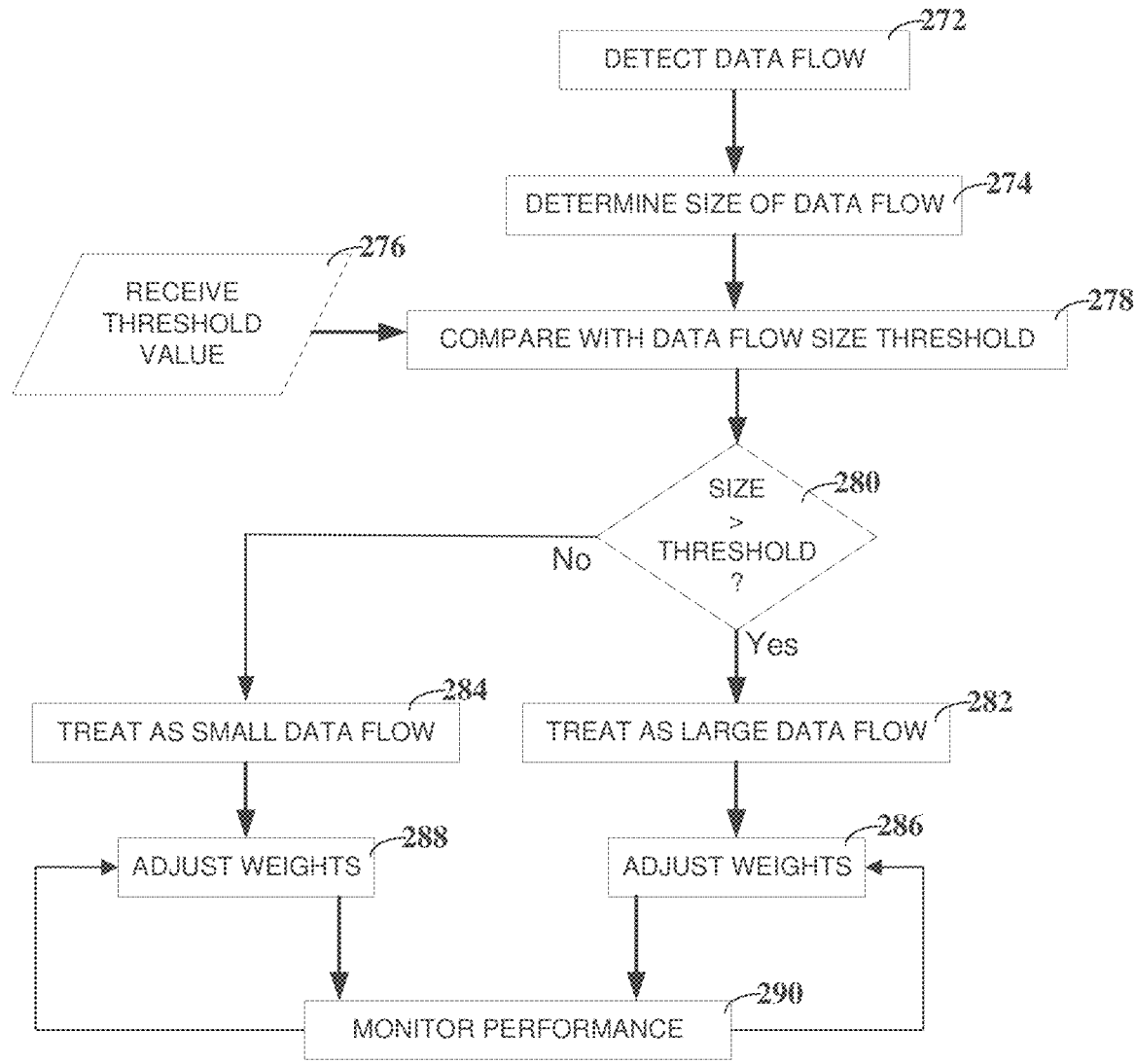
FIG. 2E depicts an illustrative embodiment of a method in accordance with various aspects described herein.

FIG. 2E depicts an illustrative embodiment of a method 270 in accordance with various aspects described herein. The method 270 may be performed by any appropriate device in a communication network. In one embodiment, the method may be performed at a Radio Access Network (RAN) component such as an eNodeB in an LTE or 5G wireless network, or at a Radio Access Network Interface Controller (RIC) in an LTE or 5G wireless network. The RAN component communicates over radio links with one or more user equipment (UE) devices such as mobile phones, smart phones, tablet devices and laptop devices. The method 270 may be initiated in response to particular conditions, such as receipt of data for communication. In some examples, the method may not be initiated if the communication network, or portions of the communication network, are not currently congested. A traffic congestion threshold, such as 57% of maximum traffic capacity, may be set to control whether the method 270 of FIG. 2D is initiated.

The method begins at block 272 where the RAN component detects a data flow to be communicated over a wireless link. The data flow may include any appropriate data, including video data, voice data, a data file or webpage data, and other data types as well. The data flow may be for transmission from the RAN component or another network component to a UE over a radio downlink. Or, the data flow may be for communication from the UE to the network over an uplink. In the uplink situation, the UE advises the RAN component of the data flow to be communicated including information, if available, about the nature of the data flow and the size of the data flow.

At block 274, the RAN component determines a size of the data flow. Many if not most data flows for transmission in a mobility network are relatively small in size, less than 200 KBytes in size. Some data flows are larger and some data flows are of indeterminate size. An example of an indeterminate size data flow is a streaming video which may last seconds, minutes or hours, depending on viewership.

At block 276 a threshold value is received and at block 278, the size of the data flow is compared with the threshold value. The threshold value may be any suitable value and may be retrieved from memory or provided by other equipment of the communication network. The threshold value may be set by, for example, a network operator providing data communication service to UE devices. The threshold value may be set by an equipment manufacturer providing the RAN component. The threshold value may be static or dynamic. For example, the threshold value may be established at 200 KBytes for all data flows. In another example, the threshold value may be varied depending on a variety of factors including network loading or congestion, time of day, day of week, geographic location, etc.

Block 280 operates to identify the data flow receive at block 272 as a large data flow or a small data flow. In the embodiment, the size of the data flow is compared with the threshold value received at block 276. If the size of the data flow exceeds the threshold value, the data flow is treated as a large data flow, block 282. If the size of the data flow does not exceed the threshold value, the data flow is treated as a small data flow, block 284. If the size of the data flow is indeterminate, the data flow may be treated as either a large data flow or a small data flow according to operational preference. In one example, all data flows are treated as small data flows by default and their status is modified if appropriate.

If at block 282, the data flow is to be treated as a large data flow, the data flow will be de-prioritized for transmission between the RAN component and the UE. A network component, such as a scheduler of an eNodeB or other network device, controls the prioritization and timing of communication of data on downlinks and uplinks with the UE. The scheduler, for example, takes into account factors such as quality of service (QOS) class identifier (QCI) when determining a priority for transmission of a data flow or other communication. It has been observed that large data flows are relatively insensitive to prioritization while small data flows can benefit dramatically from prioritization. Reducing the priority of a large data flow corresponds to changing the timing at which the large data flow may be transmitted. Depending on various factors, the timing of transmission of the large data flow may be delayed in favor of one or more small data flows, as identified at block 280.

While the large data flow may be delayed, overall network performance may be improved. This is particularly true at times when the network including the radio access network is relatively congested.

In one embodiment, the large data flow is de-prioritized by adjusting QCI weights of the large data flow. QCI weights are one factor used by the scheduler for prioritizing communications among users or UE in the radio access network. In another example, the large data flow is de-prioritized by assigning the large data flow to a particular predetermined QCI class and adjusting the priorities of that particular QCI class. An example is QCI class QCI9. In this example, when the scheduler encounters data classed as QCI9, the QCI weights are adjusted to reduce the priority of the data. For example the weight may be adjusted to a level of 0.25 or 0.50 of other, non-large-data flows to reduce the priority of communication of the large data flow.

If at block 282, the data flow is to be treated as a small data flow, the data flow will be prioritized as a small data flow for transmission between the RAN component and the UE, block 284. This may be done, for example, by assigning the small data flow to a particular predetermined QCI class such as QCI8. In other examples, this can be done by adjusting the QCI weight for the small data flow, such as by increasing the QCI weight to 1.25 or 1.5 times the original weight for that class. Alternatively, the small data flows may be maintained unchanged as to weighting and prioritization and only large data flows adjusted at block 286.

At block 290, performance of communication of data in the communication network may be monitored to estimate the effects of the method 270 on network performance and provide feedback to control adjustments made for the large data flows and the small data flows. For example, if overall network throughput does not improve responsive to the adjustments of block 282 and block 284, information may be provided to the scheduler that sets the QCI weights. The QCI weights or other factors may be changed dynamically in response to performance statistics. If the performance is impacted negatively and that impact is determined to be due to dramatic QCI weight change, the QCI weights can be rolled back to mitigate the impact.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Accordingly, the system and method in accordance with embodiments described herein can improve network performance through QoS differentiation on different data flows. Large data flows can be de-prioritized by adjusting their QCI weights to the scheduler, based on the findings that large flows are insensitive to prioritization while small flows can benefit dramatically from prioritization. A traffic classifier performs traffic categorization to distinguish large and small data flows. Based on the flow categorization, QCI weights are adjusted to effect the resource allocation in the scheduler for different flows. Service differentiation is applied to proportional fair schedulers to receive multiple benefits from such scheduler's inherent operation. In embodiments, the magnitude of QCI weight change is refined by measured performance results from a feedback loop.

Other benefits may be realized as well. For example, embodiments of the disclosed system and method improve network performance. Implementations permit a network operator to defer carrier deployment of additional equipment to handle increased usage and reduce capital expenditures. The system and method are readily implemented in existing infrastructure equipment such Radio Access Network devices and a RIC controller. Further, the system and method are not constrained by specific radio access technologies therefore can be used for LTE, 5G and future technologies.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 220, system 240, and method 270 presented in FIGS. 1, 2B, 2C, 2E, and 3. For example, virtualized communication network 300 can facilitate in whole or in part receiving a data flow for radio transmission and determining whether the data flow is a large data flow or a small data flow. Large data flows are given a reduced priority when scheduling communication of data flows so that overall performance of a communication network is improved.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
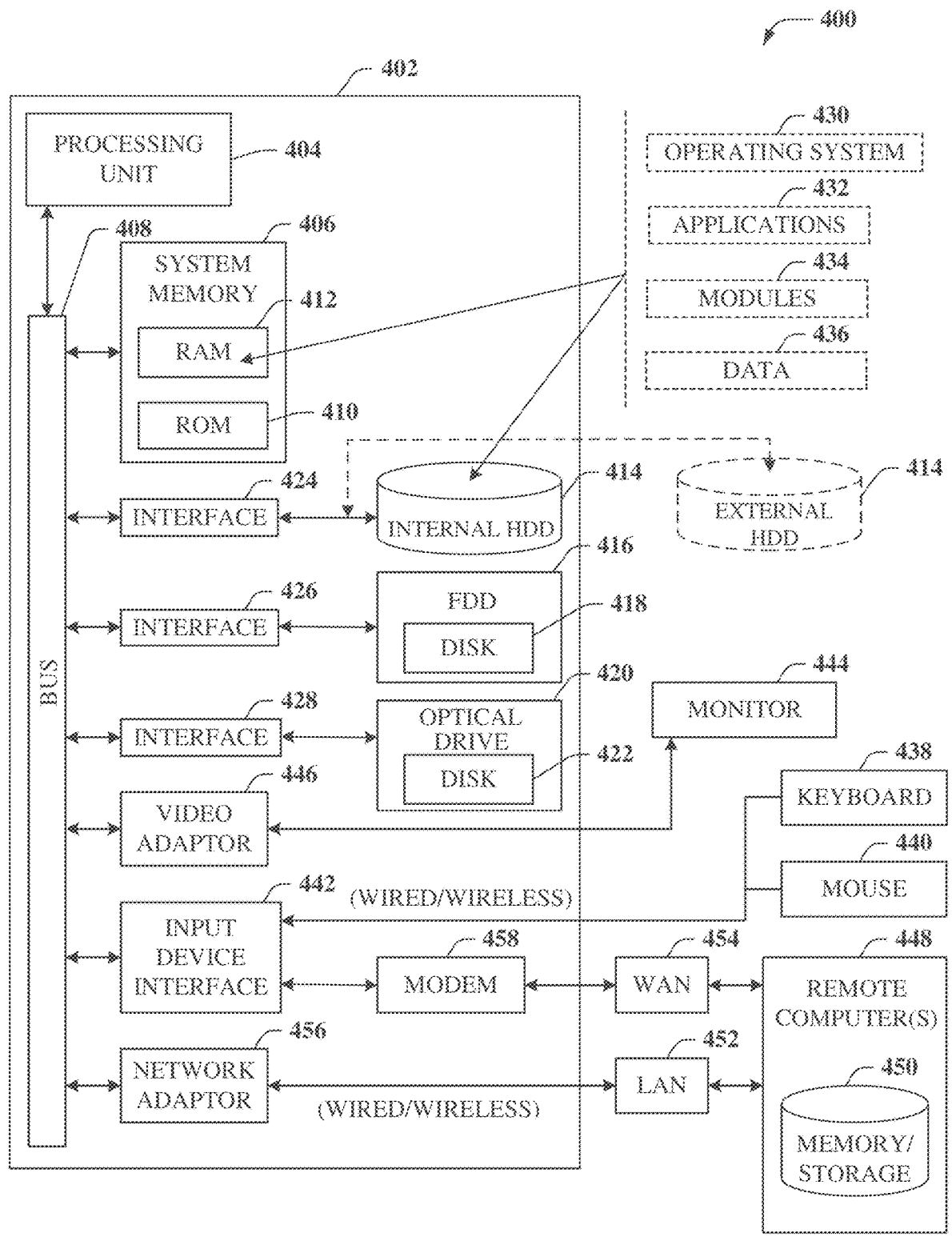
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving a data flow for radio transmission and determining whether the data flow is a large data flow or a small data flow. Large data flows are given a reduced priority when scheduling communication of data flows so that overall performance of a communication network is improved.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
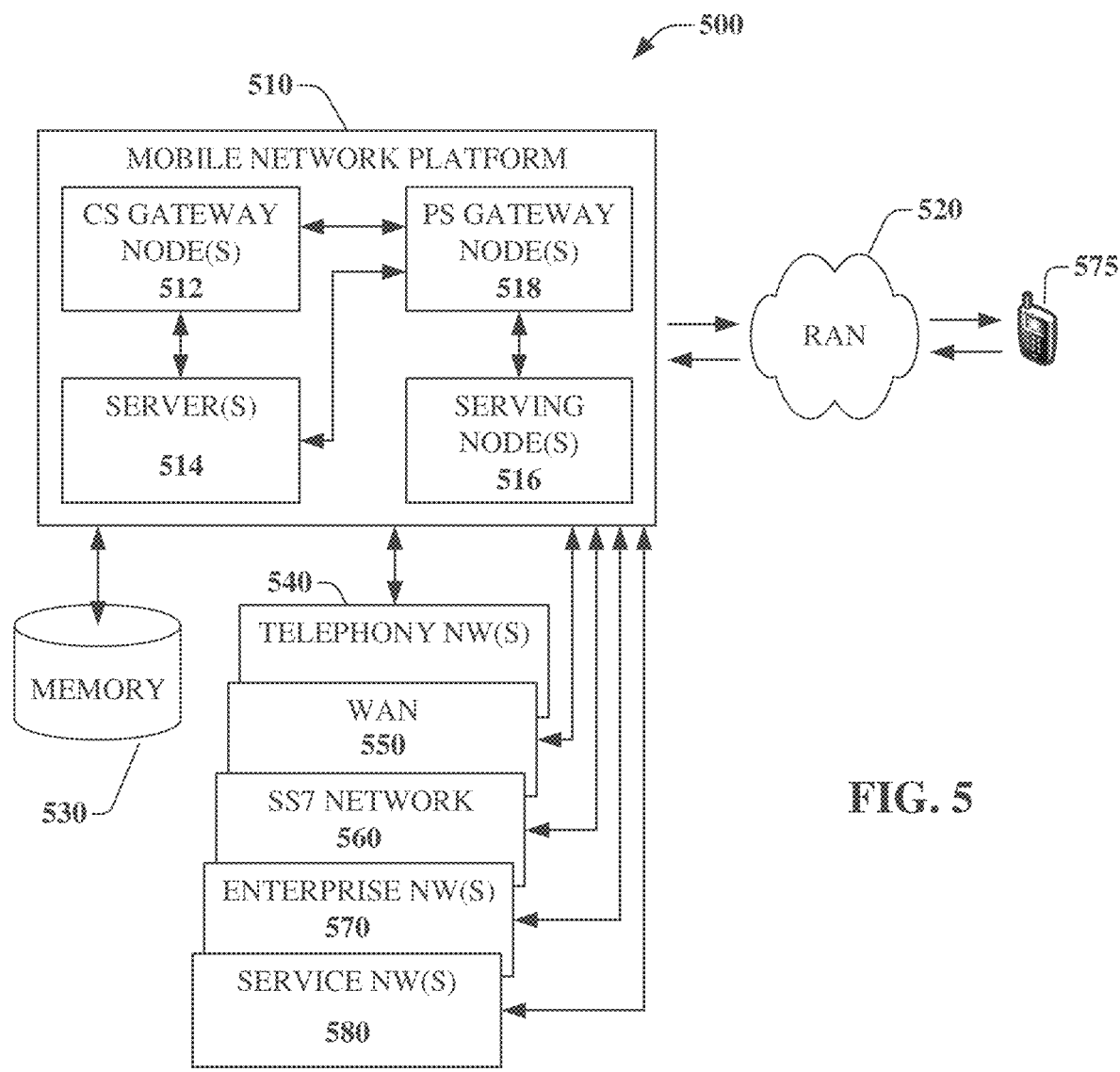
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving a data flow for radio transmission between the mobile network platform and user radio devices and for determining whether the data flow is a large data flow or a small data flow. Large data flows are given a reduced priority when scheduling communication of data flows so that overall performance of a communication network is improved. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
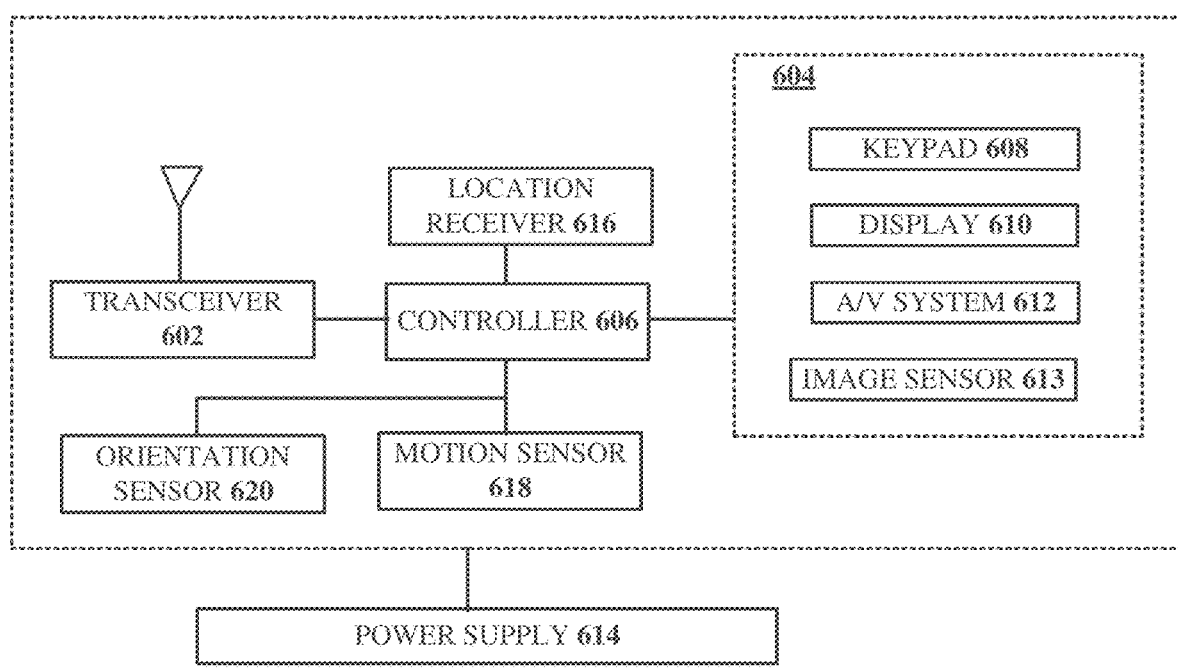
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving a data flow for radio transmission, for example in a fixed wireless station and determining whether the data flow is a large data flow or a small data flow. Large data flows may be given a reduced priority when scheduling communication of data flows so that overall performance of a communication network is improved.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth R Special Interest Group and the ZigBee R Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    assigning, by a processing system including a processor, a priority to each respective data traffic flow of a plurality of data traffic flows, wherein the plurality of data traffic flows are received at a radio access network, wherein the each respective data traffic flow is for radio communication between the radio access network and respective user equipment, wherein the each respective data traffic flow can be classified as a large data traffic flow or a small data traffic flow, wherein the assigning the priority comprises assigning a relatively lower priority to the each respective data traffic flow responsive to a classifying of the each respective data traffic flow as a large data traffic flow and assigning a relatively higher priority to the each respective data traffic flow responsive to a classifying of the each respective data traffic flow as a small data traffic flow, wherein the assigning the priority further comprises assigning the each respective data traffic flow to a predetermined Quality of Service (QoS) class of the radio access network, wherein the predetermined QoS class has a predetermined priority, and wherein the assigning the priority further comprises assigning a weight to the each respective data traffic flow according to the classifying so that the each respective data traffic flow classified as a large data traffic flow has a lower weight within the predetermined QoS class;
    assigning, by the processing system, communication resources to the each respective data traffic flow, wherein the communication resources are assigned according to an assigned priority of the each respective data traffic flow; and
    communicating, by the processing system, the each respective data traffic flow to the respective user equipment, wherein the communicating is responsive to the assigning the communication resources.

2. The method of claim 1, wherein the each respective data traffic flow can be classified according to a predetermined size criterion.

3. The method of claim 2, further comprising:
    receiving, by the processing system, a threshold value as the predetermined size criterion; and
    comparing, by the processing system, a size of the each respective data traffic flow with the threshold value to classify the each respective data traffic flow as a large data traffic flow or a small data traffic flow.

4. The method of claim 1, further comprising:
    monitoring, by the processing system, performance of the radio access network for radio communication between the radio access network and respective user equipment; and
    updating, by the processing system, a priority assigned to the each respective data traffic flow responsive to the monitoring.

5. The method of claim 1, further comprising:
    determining, by the processing system, a relative congestion level of the radio access network; and
    classifying, by the processing system, the each respective data traffic flow as a large data traffic flow or a small data traffic flow only in response to the relative congestion level of the radio access network exceeding a congestion threshold.

6. The method of claim 1, further comprising:
    monitoring, by the processing system, performance of the radio access network for radio communication between the radio access network and respective user equipment; and
    adjusting, by the processing system, the weight assigned to the each respective data traffic flow according to the monitoring.

7. The method of claim 1, wherein each respective user equipment comprises a respective smart phone.

8. A radio access network, comprising:
a processing system including a processor; and
a memory that stores executable instructions that, when executed by the processing system, facilitate performance of operations, the operations comprising:
adjusting a priority of a data flow, wherein the data flow is for radio communication between the radio access network and user equipment, wherein the adjusting the priority of the data flow is to produce an adjusted priority, wherein the adjusting the priority of the data flow comprises reducing relative priority of the data flow responsive to a classifying of the data flow as a large data flow, wherein the adjusting the priority of the data flow further comprises assigning the data flow to a Quality of Service class, wherein the adjusting the priority of the data flow further comprises adjusting weights of data flows assigned to the Quality of Service class, and wherein the adjusting the weights comprises adjusting the weights according to the classifying of the data flow to produce the adjusted priority so that large data flows assigned to the Quality of Service class have a relatively lower priority and small data flows assigned to the Quality of Service class have a relatively higher priority; and
communicating data including the data flow between the radio access network and the user equipment, wherein the communicating the data is according to the adjusted priority.

9. The radio access network of claim 8, wherein the adjusting the priority of the data flow further comprises:
assigning the data flow to the Quality of Service class having a predetermined Quality of Service Class Identifier (QCI) priority, and wherein the communicating the data comprises communicating the data according to the predetermined QCI priority.

10. The radio access network of claim 8, wherein the operations further comprise classifying the data flow as the large data flow, and wherein the classifying the data flow as the large data flow comprises:
determining a size of the data flow;
comparing the size of the data flow with a threshold value; and
classifying the data flow responsive to the comparing.

11. The radio access network of claim 10, wherein the operations further comprise:
determining the threshold value at the radio access network.

12. The radio access network of claim 11, wherein the threshold value is determined based on a current time, a current location of the radio access network, or a current traffic level.

13. The radio access network of claim 8, wherein the adjusting the priority of the data flow further comprises:
in a scheduler of the radio access network, assigning the data flow to the Quality of Service class having a predetermined Quality of Service Class Identifier (QCI) priority, wherein the communicating the data comprises communicating the data according to the predetermined QCI priority.

14. The radio access network of claim 13, wherein the adjusting the priority of the data flow further comprises:
determining, by the scheduler, a communication priority of the data flow, wherein the determining is responsive to at least the predetermined QCI priority; and
assigning, by the scheduler, communication resources of the radio access network, wherein the assigning is responsive to the communication priority of the data flow and communication priorities of other data of the radio access network.

15. The radio access network of claim 8, wherein the adjusting the priority of the data flow further comprises:
providing adjusted weights to a scheduler of the radio access network;
adjusting, by the scheduler, a communication priority of the data flow according to the adjusted weights; and
assigning, by the scheduler, communication resources of the radio access network, wherein the assigning is responsive to the communication priority of the data flow and communication priorities of other data of the radio access network.

16. The radio access network of claim 8, wherein the user equipment comprises a smart phone.

17. A non-transitory machine-readable medium comprising executable instructions that, when executed by a processing system including a processor, facilitate performance of operations, the operations comprising:
classifying each of a plurality of data flows as a large data flow or a small data flow, wherein each of the plurality of data flows is assigned for radio communication between a radio access network and user equipment in an area served by the radio access network, wherein the classifying is only in response to a determination that a relative congestion level of the radio access network exceeds a congestion threshold;
reducing priority of data flows classified as large data flows relative to priority of data flows classified as small data flows so that the data flows classified as small data flows have priority for the radio communication between the radio access network and the user equipment; and
communicating the data flows between the radio access network and the user equipment based on assigned radio resources, the assigned radio resources being according to priorities of the data flows.

18. The non-transitory machine-readable medium of claim 17, wherein the operations further comprise:
assigning each of the plurality of data flows to a Quality of Service (QOS) class of a plurality of QoS classes according to the classifying, wherein each respective QoS class of the plurality of QoS classes has a respective QoS class priority; and
scheduling the data flows for the radio communication according to the respective QoS class priority.

19. The non-transitory machine-readable medium of claim 18, wherein the scheduling the data flows for the radio communication comprises a proportional fair process.

20. The non-transitory machine-readable medium of claim 17, wherein the user equipment comprises a smart phone.

* * * * *